United States Patent [19]

Mueller, Jr. et al.

[11] Patent Number: 5,405,917
[45] Date of Patent: Apr. 11, 1995

[54] SELECTIVE ADMIXTURE OF ADDITIVES FOR MODIFYING A POLYMER

[75] Inventors: Francis X. Mueller, Jr.; William R. Coutant, both of Bartlesville, Okla.

[73] Assignee: Phillips Petroleum Company, Bartlesville, Okla.

[21] Appl. No.: 142,275

[22] Filed: Oct. 26, 1993

Related U.S. Application Data

[63] Continuation-in-part of Ser. No. 913,318, Jul. 15, 1992, abandoned.

[51] Int. Cl.⁶ .................. C08F 8/00; C08F 10/00; C08C 19/04
[52] U.S. Cl. .................. 525/333.8; 525/387; 525/240; 523/324; 524/86; 524/100
[58] Field of Search .................. 525/240, 333.8, 387; 523/324; 524/86, 100

[56] References Cited

U.S. PATENT DOCUMENTS

| | | | |
|---|---|---|---|
| 3,144,436 | 8/1964 | Greene et al. | 260/93.7 |
| 3,238,176 | 3/1966 | Brooks et al. | 260/45.8 |
| 3,862,265 | 1/1975 | Steinkamp et al. | 260/878 R |
| 3,940,379 | 2/1976 | Castagna et al. | 260/88.2 |
| 4,390,666 | 6/1983 | Moriguchi et al. | 525/194 |
| 4,460,750 | 7/1984 | Thieramult et al. | 525/333.8 |
| 4,465,812 | 8/1984 | Moriguchi et al. | 525/333.8 |
| 4,578,430 | 3/1986 | Davison | 525/387 |

FOREIGN PATENT DOCUMENTS 0208353  1/1987  European Pat. Off. ......... 525/333.8

Primary Examiner—Paul R. Michl
Assistant Examiner—LaVonda R. DeWitt
Attorney, Agent, or Firm—George E. Bogatie

[57] ABSTRACT

The molecular weight of solid polymers, particularly polyolefins, is modified by addition of organic peroxides (or other free radical generators), which is admixed in a first reaction zone. The polymer is then melted followed by addition of additives such as antioxidants and light stabilizers, which are admixed in a second reaction zone where intense and rapid mixing occurs, such as within the barrel of an extruder. The separate admixture of primary and secondary additives provides improved color and odor characteristics for the polymer compared to concurrent admixture of all the additives.

16 Claims, 1 Drawing Sheet

SELECTIVE ADMIXTURE OF ADDITIVES FOR MODIFYING A POLYMER

This application is a continuation-in-part of application Ser. No. 07/913,318, filed Jul. 15, 1992, abandoned.

This invention relates to polyolefins. In one aspect, it relates to modifying molecular weight of polyethylene and polypropylene polymers by admixture of additives with the polymer. More specifically, this invention relates to a process for sequential admixture of various additives with polyolefins.

BACKGROUND OF THE INVENTION

One of the most valuable characteristics of polyolefins as a class of materials is versatility. They can be tailored to many fabrication methods to provide products such as fibers, films, molding resins, etc. which have excellent physical and chemical properties for a particular application. A large number of additives are used in polymer technology to improve, strengthen or otherwise alter the polymer, such that additives used in preparing a polymer are often a critical factor in commercial success of the final product.

Many specially tailored polymers employ free radical generators such as organic peroxides as an additive, for example to lightly crosslink polyethylene, or to visbreak polypropylene, predetermined amounts of organic peroxides are added to the polymer. As used herein, the term "visbreak" is taken to serve as evidence for chain scission of the polymer. Additional chemical additives such as antioxidants, antistats, flame retardants, light stabilizers, etc. are also employed is these polymers to prevent oxidation, discoloration, static charge, or thermal degradation during subsequent melting processes which the polymer must undergo. For example, it is well known that polyethylene melt flow reduction, which can be achieved by addition of organic peroxides, is effective for improving bubble strength for blown film applications. Likewise, it is known that polypropylene visbreaking, which also can be achieved by addition of organic peroxides, is effective for obtaining narrower molecular weight distribution and enhanced flow characteristics. Use of organic peroxide additives in combination with certain other additives such as antioxidants, and light stabilizer additives, however, has resulted in undesirable color and odor in the polymers containing the multiple additives.

Accordingly, it is an object of this invention to eliminate the above mentioned color and odor problems associated with polymers containing multiple additives.

It is a more specific object of this invention to provide a process for producing olefin polymers having desirable physical properties without impairing color or odor characteristics of the polymer.

It is another object of this invention to provide a continuous or batch process which will reduce the quantity of free radical generator required to modify a polymer to a desired viscosity.

It is another object of this invention to provide a polymer admixture process which is safe, simple, effective and economical.

A further object of this invention is to provide polymers which have improved processability.

SUMMARY OF THE INVENTION

In accordance with this invention, we have discovered that certain additives used in olefin polymers for modifying chemical properties such as oxidative degradation, light stabilization, etc., which degrade the color and/or odor of the olefin polymer when admixed in the presence of a free radical generator, can be effectively added after admixture of the free radical generator.

A dry polyolefin material is modified by admixing an amount of a free radical generator required to produce a desired melt flow, and the admixture is maintained in a first reaction zone under conditions to generate free radicals for a time sufficient to react substantially all of the free radical generator, and to heat the admixture sufficiently to form a molten polymer. The molten polymer is passed to a second reaction zone where additives such as antioxidants and light stabilizers are admixed with the molten polymer, and the molten polymer is extruded to produce oxidation and light stabilized polymer products in the form of pellets, sheets or other shapes.

In a preferred embodiment, the second reaction zone is a special reaction zone where the polymer is in a molten condition and where rapid, intensive mixing of the secondary additives with the molten polymer occurs, such as within the barrel of an extruder.

Additional objects and advantages of the invention will be apparent from the following detailed description of the preferred embodiment of the invention as illustrated by the drawings in which:

DETAILED DESCRIPTION OF THE PREFERRED EMBODIMENT

Figure 1:
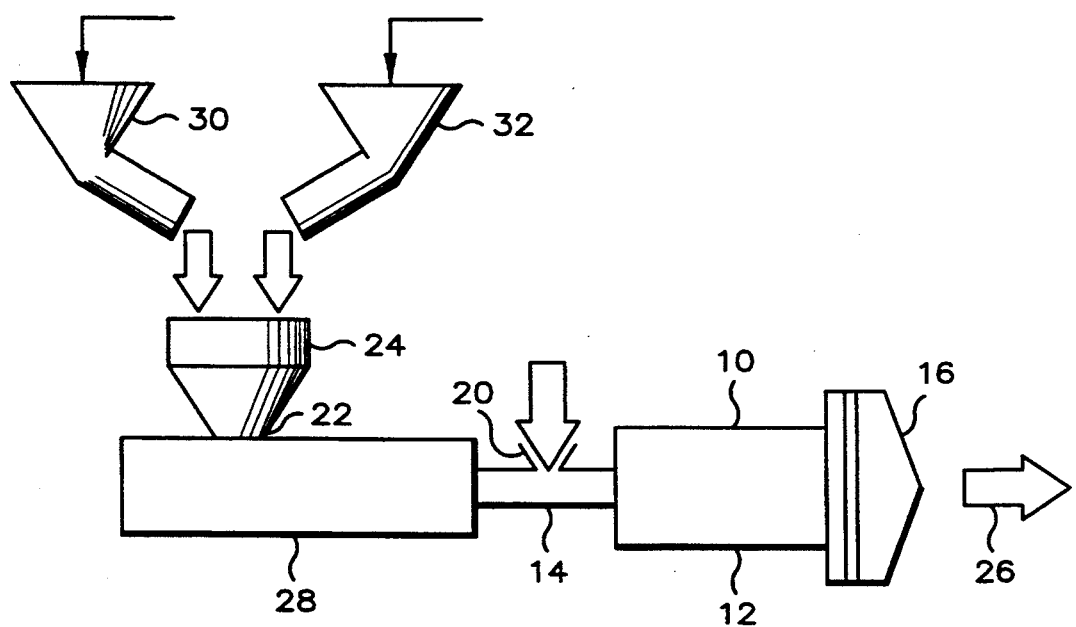
FIG. 1 is a simplified schematic representation illustrating process flow of a polymer finishing operation according to this invention.

Extruders have been used conventionally for many years to process all types of polymeric materials and especially polyolefins. Generally, the polymer is melted and then fed to an extruder, with the output of the extruder defined by the die shape and size. Dies are broadly classified as (1) sheet dies extruding flat sheets, (2) shape dies for making pipe, gasketing, tubular products, and many other designs, (3) blown film dies using an annular orifice to form a thin walled envelope, (4) spinneret dies for extrusion of single or multiple strands of polymer for textile products, rope, tire cord or webbing, and (5) pelletizing dies for granular production of the resin produced.

It is well known that various chemical reactions and modifications can take place when a polymer passes through an extruder. These modifications, however, can be accomplished in such a way that significant desirable changes in the polymer composition and/or rheology can be affected.

While the process of this invention is applicable to all polymers suitable for processing by an extruder, particularly noted are thermoplastics such as nylons, polyesters, polycarbonates, engineering plastics, and polyacetals. It is especially useful for $C_2$–$C_{12}$ polyolefins, preferably $C_2$–$C_8$ polyolefins including copolymers of olefins with other monomers. Examples of suitable polyolefins include low or high density polyethylene. The preferred polyolefins employed in this invention contain ethylene and/or propylene, i.e. polyethylene and polypropylene. The starting polymers used as the base material preferably have a melt index (MI) of 0.05 to 1,000, preferably 0.05 to 50, and most preferably 0.05 to 10.

The processes for making these $C_2$–$C_{12}$ polyolefins are well known and form no part of the present invention.

After the polymer has been produced, it is preferred according to this invention that the polymer in a powder or fluff state be given a molecular weight modifying charge with an organic peroxide before additional processing occurs in a molten state. Preferably organic peroxide is present in the modified polymer in an amount just sufficient to provide a desired melt flow in the modified polymer. When the polymer, already modified in molecular weight, is in the molten state and at a suitable temperature, which generally occurs after the polymer is heated by shear energy in a mixer, secondary additives of the various types can be introduced with it and the molten admixture fed to an extruder where very rapid diffusion or dispersion of the secondary additives throughout the polymer can occur. Thus, it is possible to achieve extensive reactions with very short reaction zone residence time.

A distinction should be drawn between polymers whose properties are largely determined by the ethylene content and those polymers whose properties are largely determined by their $C_3$–$C_{12}$ olefinic content. This distinction is evidenced by the fact that polyethylene and ethylene containing polymer tend to crosslink in the presence of peroxides and/or hydroperoxides under conditions in which $C_3$ and above polyolefins tend to visbreak with peroxides.

Referring now to the drawing, there is illustrated a simplified process flow for an embodiment of this invention which is suitable for continuous operation. It will be appreciated by those skilled in the art that since FIG. 1 is a simplified schematic only, many items of equipment which would be needed for a successful operation of a commercial plant have been omitted for the sake of clarity. Such items of equipment would include, for example, temperature, flow and pressure measurement instruments, corresponding process controllers, additional feeders, mixers, heat exchangers, valves etc. All of these items would be provided in accordance with standard chemical engineering practice to maintain desired conditions throughout the process, and are not necessary to describe the present invention.

There is shown generally at 10 in FIG. 1 a conventional hot melt extruder which is melt fed and which may be a single screw or a double screw type. Extruders using twin screws are preferred for large volume production units for pelletizing resins in petro-chemical plants and are typically equipped with various combinations of intermeshing and non-intermeshing screws that co-rotate or counter-rotate. Extruder screw design features which allow melting and blending and other processing in a single extruder machine are also suitable for use in the practice of this invention.

A feedhopper 20 or other suitable device connects extruder barrel section 12 to a source of secondary additives via conduit means 14. Injection of the secondary additives at this point, which relies on low pressure existing in melt feed conduit 14, provides thorough dispersion of the additive in the molten mass over an extremely short period of time in the extruder if appropriate controls over extruder speed and additive feed rate are maintained. The residence time of the thermoplastic material in die section 16 of extruder 10 is such that at least the outer surface of the extrudate 26 has solidified before the extrudate 26 exits the die section 16.

A thermoplastic material in particulate form e.g. pellets, powder or fluff is charged to an inlet section 22 of a continuous or batch mixer 28 via feed hopper 24, and the polymer particles are converted into molten thermoplastic mass by shear energy in the mixer. The output melt temperature of the mixer 28 is primarily a function of internal shear energy in the mixer 28 (converted to heat energy), and the temperature of the melt is as important as the output rate for quality extrusion.

Mixing of dry polymer material and primary additive materials including peroxide compatible additives and a free radical generator, which is preferably liquid organic peroxide, occurs in the continuous inline mixer 28 which is supplied from the dry chemical feeders for polymer fluff and primary additive illustrated at 30 and 32 respectively. Other suitable means for feeding material to the mixer may be employed in the practice of this invention such as adding liquid peroxide by spraying or feeding a masterbatch of plastic compounds, which includes a high concentration of an additive or additives, via feeder 32.

In this preferred embodiment, the organic peroxide for molecular weight modification is added to the polymer fluff either as a liquid spray or in a masterbatch. The secondary additives, e.g., antioxidants and light stabilizers are added to the molten polymer either as a dry or liquid component. The process of this embodiment of the invention can be conveniently operated to give high volume throughput with good quality.

Polyolefins treated according to the sequential additive steps of the present invention have improved color and odor characteristics compared to non-sequential additive steps, where unreacted peroxide is allowed to contact certain other chemical additives. Further, according to this invention lower levels of peroxide are required for modifying molecular weight of the polymer so as to attain a desired melt flow rate.

The peroxide concentration in the modified polymer according to this invention, may range from 0 to about 2.0 weight percent, based on the total polymer concentration. A range of about 0.3 to about 0.9 is more preferable. The most preferred range is about 0.04 to about 0.08 weight percent of organic peroxide. This range is most preferred because it is generally sufficient to produce desirable melt flow rates without degrading color or odor of the polymer. An example of a preferred organic peroxide useful as a molecular weight modifying agent is 2,5-Dimethyl-2,5Di(t-Butylperoxy)hexane. This organic peroxide is marketed under the trademark Aztec ® 2,5-Di by Aztec Catalyst Company Houston, Tex.

According to this invention any additive which degrades color or odor of the polymer when contacted with a free radical generator is admixed as a secondary additive. Examples of stabilizing additives which are preferably admixed as secondary additives include antioxidants such as 1,3,5-tris(3,5-di-tert-butyl-4-hydroxy benzyl)-s-triazine-2,4,6-(1H,3H,5H)trione. This antioxidant is available under the trademark Irganox ® 3114 available from Ciba-Geigy Corporation, and a light stabilizer such as Poly[[6-[(1,1,3,3-tetramethylbutyl) amino]-s-triazine-2,4-diyl ] [(2,2,6,6-tetramethyl-4-piperidyl) imino]hexamethylene [(2,2,6,6-tetramethyl-4-piperidyl)imino]]. This stabilizer is available under the trade name Chimassorb ® 944 available from Ciba-Geigy Corp. Hawthorne, N.Y.

For aesthetic considerations, it is desirable to control the color of polymer products, and generally it is desired to minimize yellowing of the product. The degree of yellowing may be determined by a Hunter colorimeter which employs a tristimulus method for achieving better color definitions. The tristimulus method is a relatively complicated system of specifying the continuous reflectance curve into three numbers. Generally these correspond to red, green and blue spectral responses and express the amount of each of the three primary responses, that when combined in specific amounts, produces a total color sensation. In the following examples the Hunter "b" value correlates best with the yellowing characteristic of the polymer produced and accordingly, a lower Hunter "b" value indicates a more desirable condition. A comprehensive discussion of the tristimulus expressions can be found in Kirk-Othmer Encyclopedia of Chemical Technology, 2d Vol. 5, New York, John Wiley & Son.

A further understanding of the present invention and its advantages is provided by reference to the following examples. These examples are provided merely to illustrate the practice of the invention and should not be read as limiting the scope of the invention or the appended claims in any way. Reasonable variations and modifications, not departing from the essence and spirit of the invention, are contemplated to be within -the scope of the patent protection desired.

EXAMPLE I

In this example the experimental procedure utilized in a pilot plant operation, and the effect of adding stabilizers at different stages during the finishing process for polyethylene are described.

Pilot plant equipment used in these examples comprises a size 2 Farrell continuous mixer and a 3½" diameter hot melt extruder.

A resinous polymerization reaction product in a powder form, referred to hereinafter as a "fluff", is melted and then processed through an extruder to form resin pellets. The finishing process includes a two-step operation for admixture of additives during a controlled rheology modification of the polymer resin. In this finishing process, primary additives are first admixed with the fluff, and secondary additives are then admixed after the fluff is melted.

Primary feed material is prepared, for example, by combining fluff and certain additives in a 40 lb. Henschel blender. With the blender operating at a reduced speed, liquid additives are slowly poured into the fluff so as to disperse the liquid additive uniformly into the fluff. The amount of liquid additive is determined by the requirement for the total blend. The Henschel blender is then turned to a high speed for 1 min. and the resulting blend dumped into a 32 gal. fiber drum. To the above-described liquid concentrate blend, there is added additional fluff along with optional dry additives. The fiber drum is then tumbled for 20 min. to disperse the liquid peroxide concentrate and the dry additives, if present.

Secondary feed material also containing dry additives is prepared, for example, by providing a quantity of fluff to a 32 gal. fiber drum, admixing the dry additives as desired, and tumbling the mixture in the drum for 20 min.

The primary material is passed to a continuous mixer where the material is rendered molten and then the secondary material is admixed with the molten polymer. The resulting blend is then passed to the extruder to form pellets. Extruder and mixer process conditions for making the pellets are shown in Table VII.

Polyethylene Blend

For testing blends of polyethylene fluff, prepared over a titanium-magnesium catalyst, the polyethylene blend components comprise:

53% fluff of 0.5 HLMI, and a density of 0.932 gm/cc, and 47% fluff of 100 MI, and a density of 0.972 gm/cc.

Additive components of the primary and secondary feeds for six experimental runs are provided according to Table I. Resin pellets are prepared according to the above described procedure and the properties of the pellets are determined.

TABLE I

| Run | A | B | C | D | E |
|---|---|---|---|---|---|
| Primary Additive Package | | | | | |
| BHT[1], wt. % | .02 | — | — | — | .02 |
| Irganox ® 1010[2], wt. % | .07 | — | — | — | .07 |
| DLTDP[3], wt. % | .03 | — | — | — | .03 |
| Ultranox ® 626[4], wt. % | .05 | — | — | — | .05 |
| 2,5-Di peroxide[5], ppm | — | 20 | 40 | 60 | 100 |
| Secondary Additive Package | | | | | |
| BHT[1], wt. % | — | .02 | .02 | .02 | — |
| Irganox ® 1010[2], wt. % | — | .07 | .07 | .07 | — |
| DLTDP[3], wt. % | — | .03 | .03 | .03 | — |
| Ultranox ® 626[4], wt. % | — | .05 | .05 | .05 | — |

[1] 2,6-di-t-butyl-4-methylphenol
[2] Tetrakis[methylene(3,5-di-tert-butyl-4-hydroxycinnamate)]methane
[3] Dilauryl thiodipropionate
[4] Bis(2,4-di-tert-butylphenyl)pentaerythritol diphosphite
[5] 2,5-Dimethyl-2,5Di(t-Butylperoxy)hexane diluted 40/1 with mineral oil Effectiveness of the sequential admixture of additives in improving color characteristics without impairing other properties is illustrated in Table II by lower Hunter b values for runs B, C and D where secondary additives were provided.

TABLE II

| | Effect of Sequential Additive Step on Pellets | | | | |
|---|---|---|---|---|---|
| Run | A | B | C | D | E |
| Color a | −0.50 | −1.0 | −0.98 | −0.53 | −1.18 |
| Color b | −0.65 | 0.98 | −0.07 | 1.75 | 6.50 |
| Color L | 84.7 | 85.2 | 85.6 | 83.6 | 93.0 |
| 10× Melt Index, g/10 min. | 9.5 | 9.0 | 8.9 | 8.3 | 8.9 |
| Density, g/cc | 0.95 | 0.95 | 0.95 | 0.95 | 0.95 |

EXAMPLE II

Propropylene Blends

In this example, testing of polypropylene prepared over a TiCl$_3$ based catalyst, and formed into pellets according to the procedure described in Example I, is shown. Additive components of primary and secondary feeds for three experimental runs are given in Table III below.

TABLE III

| Run | F | G | H |
|---|---|---|---|
| Primary Additive Package | | | |
| Irganox ® 3114[1], wt. % | .075 | — | — |
| Ultranox ® 626[2], wt. % | .075 | .075 | — |
| Chimassorb ®[3], 944LD, wt. % | .038 | .038 | .038 |
| Zinc Stearate, wt. % | .075 | .075 | .075 |
| 2,5-Di Peroxide, wt. % | .06 | .06 | .05 |
| Distilled Water, wt. % | 0.40 | 0.40 | 0.40 |
| Secondary Additive Package | | | |
| Irganox ® 3114[1], wt. % | — | .075 | .075 |

TABLE III-continued

| Run | F | G | H |
|---|---|---|---|
| Ultranox ® 626[2], wt. % | — | — | .075 |

[1]1,3,5-Tris(3,5-di-tert-butyl-4-hydroxy benzyl)-s-triazine-2,4,6-(1H,3H,5H)trione
[2]Bis(2,4-di-tert-butylphenyl)pentaerythritol diphosphite
[3]Poly[[6-[(1,1,3,3-tetramethybutyl)amino]-s-triazine-2-4-diyl][2,2,6,6-tetramethyl-4-piperidyl)imino]hexamethylene[(2,2,6,6-tetramethyl-4-piperidyl)imino]]

Effectiveness of the sequential admixture of additives in improving color characteristics without impairing other properties is illustrated in Table IV by lower Hunter b values for runs G and H where secondary additives were provided.

TABLE IV

Effect of Sequential Additive Step on Pellets

| Run | F | G | H |
|---|---|---|---|
| Color a | −1.9 | −1.3 | −1.2 |
| Color b | 6.5 | 3.0 | 2.2 |
| Color L | 79.2 | 79.1 | 77.6 |
| MI[1] g/10 min. | 34.9 | 32.1 | 30.1 |
| OIT[2] min. | 3.0 | 2.5 | 2.8 |

[1]Pooled standard deviation is 1.8 (df = 28) for melt flow determinations
[2]Pooled standard deviation for OIT (Oxidative Induction Time) measurements is 0.26 (df = 34)

EXAMPLE III

In this example, testing of polypropylene prepared over a MgCl$_2$ containing catalyst, and formed into pellets according to the procedure described in Example I is shown. Additive components of primary and secondary feeds for four experimental runs are given in Table V below.

TABLE V

| Run | I | J | K | L |
|---|---|---|---|---|
| Primary Additive Package | | | | |
| Irganox ® 3114[1], wt. % | .075 | — | — | — |
| Ultranox ® 626[2], wt. % | .075 | .075 | — | — |
| Chimassorb ® 944LD[3], wt. % | .038 | .038 | .038 | — |
| Zinc Stearate, wt. % | .075 | .075 | .075 | — |
| Distilled water, wt. % | 0.4 | 0.4 | 0.4 | 0.4 |
| 2,5-Di peroxide, wt. % | .06 | .06 | .06 | .06 |
| Secondary Additive Package | | | | |
| Irganox ® 3114[1], wt. % | — | .075 | .075 | .075 |
| Ultranox ® 626[2], wt. % | — | — | .075 | .075 |
| Chimassorb ® 944LD[3], wt. % | — | — | — | .038 |
| Zinc Stearate, wt. % | — | — | — | .075 |

[1]1,3,5-Tris(3,5-di-tert-butyl-4-hydroxy benzyl)-s-trazine-2,4,6-(1H,3H,5H)trione
[2]Bis(2,4-di-tert-butylphenyl)pentaerythritol diphosphite
[3]Poly[[6-[(1,1,3,3-tetramethybutyl)amino]-2-triazine-2,4-diyl][2,2,6,6-tetramethyl-4-piperidyl)imino]hexamethylene[(2,2,6,6-tetramethyl-4-piperidyl)imino]]

Effectiveness of the sequential admixture of additives in improving color characteristics without impairing other properties is illustrated in Table VI by lower Hunter b values for runs J, K and L where secondary additives were provided.

TABLE VI

Effect of Sequential Additive Steps on Pellets

| Run | I | J | K | L |
|---|---|---|---|---|
| Color a | — | — | — | — |
| Color b | 2.1 | 0.5 | 0.1 | 1.1 |
| Color L | 79.2 | 79.3 | 79.2 | 79.1 |
| MI[1] g/10 min. | 30.2 | 31.4 | 32.4 | 41.5 |
| OIT[2] min. | 2.7 | 2.9 | 3.1 | 2.8 |

[1]Pooled standard deviation is 1.8 (df = 28) for melt flow determinations
[2]Pooled standard deviation for OIT (Oxidative Induction Time) measurements is 0.26 (df = 34)

TABLE VII

| Finishing Process Conditions | Polyethylene Samples | Polypropylene Samples |
|---|---|---|
| Process Rate, kg/hr | 45.0 | 70 |
| Mixer | | |
| Rotor Speed, rpm | 570 | 790–800 |
| Barrel Heat | neutral | neutral |
| Ribbon Temp., °C. | 199–202 | 192–198 |
| Extruder | | |
| Screw Speed, rpm | 38 | 47–50 |
| Barrel Temp., °C. | 235 | 230–235 |
| Melt Discharge Temp., °C. | 237–244 | 199–205 |
| Die Pressure, psig | 1121–1300 | 200–310 |

While this invention has been described in detail for the purpose of illustration, it is not to be construed as limited thereby but is intended to cover all changes and modifications within the spirit and scope thereof.

That which is claimed is:

1. A method for improving color and odor characteristics of an olefin polymer containing additives by producing said olefin polymer in a continuous in-line process comprising the following steps performed in the sequence set forth:
   (a) blending an olefin polymer material and an amount of at least one free radical generator sufficient to produce a desired melt flow :for said olefin polymer in a first reaction zone under conditions to generate free radicals;
   (b) containing said blend of step (a) in said first zone for a time sufficient to react substantially all of said free radical generator and to heat said blend to produce a molten polymer;
   (c) passing said molten polymer to a second reaction zone;
   (d) blending said molten polymer with at least one additive selected from the group consisting of antioxidants and light stabilizers; and
   (e) processing said molten polymer through an extruder to form a desired shape.

2. A method in accordance with claim 1 wherein said free radical generator is a peroxide.

3. A method in accordance with claim 2 wherein said peroxide is 2,5-dimethyl-2,5-di(t-butylperoxy)hexane.

4. A method in accordance with claim 1 wherein said antioxidant is 1,3,5-tris(3,5-di-tert-butyl-4-hydroxy benzyl)-s-triazine-2,4,6-(1H,3H,5H)trione and said light stabilizer is poly[[6-[(1,1,3,3-tetramethylbutyl)amino]-s-triazine-2,4-diyl] [2,2,6,6-tetramethyl-4-piperidyl)imino]hexamethylene [(2,2,6,6-tetramethyl-4-piperidyl) imino]].

5. A method in accordance with claim 1 wherein said olefin polymer containing additives has a melt index in a range of about 9 to about 40.

6. A method according to claim 1 wherein said olefin polymer containing additives is a polyolefin having from about 2 to about 12 carbons atoms.

7. A method according to claim 2, wherein the amount of said peroxide present in said polymer is in a range of about 0 to about 2.0 weight percent of said polymer.

8. A method in accordance with claim 4 wherein the amount of said antioxidant present in said polymer is about 0.08 weight percent of said polymer, and said light stabilizer additive is present in an amount of about 0.04 weight percent of said polymer.

9. A method in accordance with claim 7 wherein said peroxide is 2,5-dimethyl-2,5-di(t-butylperoxy)hexane and said antioxidant is 1,3,5-tris(3,5-di-tert-butyl-4-hydroxy benzyl)-s-triazine-2,4,6-(1H,3H,5H)trione and said light stabilizer is poly[[6[(1,1,3,3-tetramethylbutyl-)amino]-s-triazine-2,4-diyl] [2,2,6,6-tetramethyl-4-piperidyl)imino]hexamethylene [(2,2,6,6-tetramethyl-4-piperidyl)imino]].

10. A method according to claim 1 wherein said free radical generator is admixed with a dry fluff polymer material in said first reaction zone which comprises a continuous mixer wherein shear energy of the mixer provides heat to melt said polymer fluff, and said antioxidant and light stabilizer additives are reacted in said second reaction zone which comprises the barrel of an extruder.

11. A method in accordance with claim 1 wherein said free radical generator and said antioxidant and light stabilizer additives are continuously blended and wherein the degree of yellowing of said olefin polymers as determined by a Hunter "b" value in a tristimulus method of color determination is in a range of about 0.1 to about 1.1.

12. A method in accordance with claim 3, wherein said olefin polymer is polyethylene, said method including:
lightly crosslinking said polyethylene by blending said peroxide.

13. A method in accordance with claim 3, wherein said olefin polymer is polypropylene, said method including:
visbreaking said polypropylene by blending said peroxide.

14. A method for improving color and odor characteristics of an olefin polymer containing additives, wherein said method comprises producing said olefin polymer in a continuous in-line process apparatus including:
(a) a first reaction zone;
(b) means for feeding a dry polymer material to said first reaction zone;
(c) means for forming a blend of at least one free radical generator with said dry polymer material in said first reaction zone, wherein substantially all of said free radical generator is reacted in said first reaction zone, and said blend is heated to form a molten polymer;
(d) a second reaction zone in fluid communication with said first reaction zone;
(e) means for blending said molten polymer with at least one additive selected from the group consisting of antioxidants and light stabilizers in said second reaction zone; and
(f) an extruder for processing said blended molten polymer formed in step (e).

15. A method in accordance with claim 14, wherein said first reaction zone comprises a mixer wherein said blend is heated by shear energy in mixing action, and said second reaction zone comprises a hot melt extruder wherein intensive mixing of said antioxidant and light stabilizer additives with said molten polymer occurs.

16. A method in accordance with claim 15, wherein the output of said hot melt extruder is defined by a die shape selected from a group of die shapes including: sheet dies, shape dies, blown film dies, spinneret dies and pelletizing dies.

* * * * *